US012731509B2

(12) United States Patent
Chen

(10) Patent No.: US 12,731,509 B2
(45) Date of Patent: Sep. 8, 2026

(54) 3-D POP-UP CARDS WITH PARALLEL BASE STRUCTURE

(71) Applicant: JAST Gifts Shenzhen Company Limited, Shenzhen City (CN)

(72) Inventor: Jen-Lin Chen, Cupertino, CA (US)

(73) Assignee: JAST Gifts Shenzhen Company Limited, Shenzhen City (CN)

( * ) Notice: Subject to any disclaimer, the term of this patent is extended or adjusted under 35 U.S.C. 154(b) by 126 days.

(21) Appl. No.: 18/236,749

(22) Filed: Aug. 22, 2023

(65) Prior Publication Data

US 2025/0069523 A1 Feb. 27, 2025

(30) Foreign Application Priority Data

Aug. 22, 2022 (DE) ......................... 202022104739.1

(51) Int. Cl.
*G09F 1/06* (2006.01)

(52) U.S. Cl.
CPC ...................................... *G09F 1/06* (2013.01)

(58) Field of Classification Search
CPC ......................................................... G09F 1/06
See application file for complete search history.

(56) References Cited

U.S. PATENT DOCUMENTS

2005/0132621 A1* 6/2005 Bostick ..................... G09F 1/06 40/124.08
2013/0139419 A1* 6/2013 Guo ..................... B42D 15/042 40/124.03
2016/0358515 A1* 12/2016 Christiansen .......... B42D 15/04
2016/0365010 A1* 12/2016 Wise ......................... G09F 1/10
2017/0087481 A1* 3/2017 Simmons ............... A63H 33/38
2019/0213921 A1* 7/2019 Rose .................... B42D 15/045
2019/0371211 A1* 12/2019 Wallen ................. B42D 15/042
2021/0005113 A1* 1/2021 Wallen ................. B42D 15/042

* cited by examiner

*Primary Examiner* — Gary C Hoge
(74) *Attorney, Agent, or Firm* — Adams & Reese LLP; John Henry Scott, III

(57) ABSTRACT

The invention relates to a 3D card having a foldable base card (1) with an inner side and an outer side, the base card (1) comprising two sections (2, 3) which are reversibly transferable from a folded state to an unfolded state along a fold (17), and having a foldable base (6, 6'), which is reversibly transferable from a flat state to a three-dimensional state, and with foldable figure elements (10, 10') which are reversibly transferable from a flat state to a three-dimensional state, and wherein the foldable base (6, 6') is formed from a plurality of base elements (I, II, III, IV) and is fixed via first fixing means (7, 7', 8, 8') on the inside of the foldable base card (1) and wherein the foldable first and/or second figure elements (10, 10') are at least partially fixed to the foldable base (6, 6'), wherein the first fixing means (7, 7', 8, 8') are provided on two opposite base elements (I, II, III, IV) and in each case one base element (I, II, III, IV) is fixed to the first section (2) via the first fixing means (7, 8) and one base element (I, II, III, IV) is fixed to the second section (3) via the first fixing means (7', 8'), and the two base elements (I, II, III, IV) fixed via the first fixing means (7, 7', 8, 8') being arranged parallel to one another and parallel to the fold (17), and the two base elements (I, II, III, IV) being arranged parallel to one another and parallel to the fold (17).

11 Claims, 5 Drawing Sheets a)

b)

3-D POP-UP CARDS WITH PARALLEL BASE STRUCTURE

Figure 1:
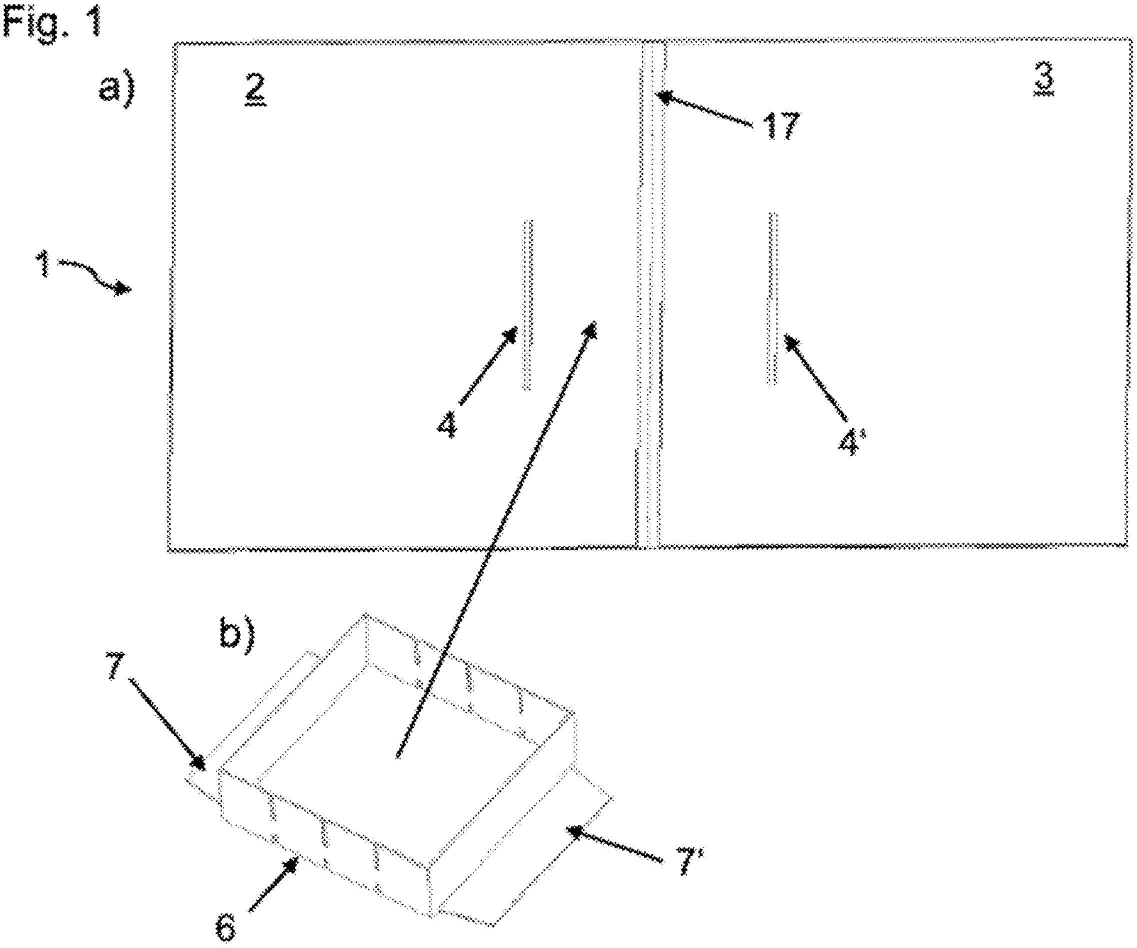

The invention relates to 3D pop-up cards having a base, wherein the 3D pop-up card comprises a base card having a first section and a second section, wherein the sections are foldably connected to each other along a fold, and the base card is thus convertible from a folded closed state to an unfolded opened state, and wherein the base card has an inner side and an outer side, wherein a base is fixed to the inner side of the base card and foldable figures are fixable to this base and the figures unfold automatically into a three-dimensional structure when the base card is transferred from a closed to an opened state.

3D pop-up cards, hereinafter also referred to simply as 3D cards, have been known for some time in a wide variety of embodiments and essentially comprise a generally simply folded card, hereinafter referred to as a base card, and at least one figure arranged on this base card. The main function of such a 3D card is that the figure, which is initially compressed essentially in two dimensions, rises three-dimensionally from the card plane when the folded 3D card is opened.

Typically, corresponding 3D cards can be opened from a closed state by unfolding the two foldable sections of the base card by a total of 180° into a planar plane.

The underlying mechanism is based on the fact that the compressed figure is attached to the base card in such a way that opening the folded base card applies a tensile stress to the figure, which transfers the figure from the compressed or folded to the three-dimensional or expanded shape.

Thus, the construction of corresponding 3D cards requires, on the one hand, the formation of the figure that can be transferred from a compressed two-dimensional to an expanded three-dimensional state, and, on the other hand, a means of attaching this figure inside the base card.

Instead of fixing the figure directly to the base card, it has become established practice to first provide a foldable base on the base card to which the figure can be fixed. This allows a wider range of figures and arrangements.

3D cards are also subject to great price pressure and pressure to innovate due to their widespread use. Accordingly, ways are constantly being sought to improve the construction of 3D cards, to make them less expensive and to vary them for new arrangements.

Thus, the task of the invention is to provide an alternative construction for bases for 3D cards, whereby a fixation of the figure to the base card and the trouble-free unfolding of the figure when opening the 3D card is ensured via a base.

This task is solved by an invention having the features of claim 1. Advantageous embodiments are in each case the subject of the dependent claims. It should be noted that the features listed individually in the claims can also be combined with one another in any desired and technologically useful manner and thus reveal further embodiments of the invention.

The following definitions are initially intended to serve in particular for understanding the precise positional relationships of the individual elements of the 3D card, since the arrangement and orientation in particular of the elements such as the base card, base and figure with respect to one another are of essential importance for understanding the invention.

The base card includes first and second sections foldably connected along a fold. First and second sections are provided foldable on top of each other along the fold, such that the inner sides of the sections and correspondingly the base card rest on top of each other when closed.

First and/or second sections may be provided at least partially in single or multiple layers, with dual-layer embodiments having an inner layer and an outer layer being preferred. The layers of the two sections need not be congruent and may cover only portions of other layers, with substantially congruent layers being preferred.

The base card has an inner side and an outer side, wherein in the case of a base card having two or more layers, the outer side is formed by the respective outermost layer and the inner side is formed by the respective innermost layer.

If the base card is unfolded in a flat plane in front of the viewer, the first section forms the left side of the base card and the second section forms the right side of the base card.

Assuming a rectangular basic shape of the base card and the two sections, respectively, to simplify the description of the position, the right and left edges of the base card and the right and left edges of the two sections, respectively, are aligned parallel to the fold, the upper and lower edges of the base card and the upper and lower edges of the two sections, respectively, are aligned perpendicular to the fold.

It is clear that the outer edges of the base card do not have to follow this strict geometry, this idealization is solely for further understanding of the positional designations.

The base is preferably provided in a rectangular shape and has four sides or side faces corresponding to a rectangle or cuboid, which are referred to as base elements. The individual base elements are foldably connected to each other.

The term "figure" is to be understood in a broad sense. Thus, a figure may comprise a single figure or a plurality of partial figures. Likewise, a figure can also be formed from a plurality of figure elements which, when viewed as a whole, do not form a uniform figure, for example a geometric or natural figure. Accordingly, a figure is to be understood as those parts of the 3D card which are arranged on the base, without these parts or also figure elements necessarily having to form a uniform figure.

Preferably, a figure comprises first and second substantially disc-shaped or flat figure elements, wherein the first figure elements are ideally arranged parallel to each other in the opened state of the base card and the second figure elements are ideally also arranged parallel to each other in the opened state of the base card and the first and second figure elements are ideally arranged perpendicular to each other in the opened state of the base card.

A figure may comprise only first figure elements, only second figure elements, or first and second figure elements.

Accordingly, a figure according to the invention may comprise, for example, a geometric shape or a natural shape, such as a plant, a human, or an animal. A figure according to the invention may also comprise, for example, a message, a greeting, or a landscape.

Combinations of different figures and figure elements are possible.

Unless expressly indicated below, all position descriptions refer to the 180° unfolded, planar or opened state of the base card or the 3D card.

A 3D card according to the invention comprises a foldable base card having an inner side and an outer side, wherein the base card comprises two sections which are reversibly transferable along a fold from a folded closed state to an unfolded opened state.

The 3D card further comprises a foldable base reversibly transferable from a flat compressed state to a three-dimensional expanded state, and first and/or second figure elements reversibly transferable from a flat compressed state to a three-dimensional expanded state, wherein the foldable base is formed of a plurality of base elements and is fixed to the inner side of the foldable base card via first fixing means, and wherein the first and/or second figure elements are fixed to the foldable base.

According to the invention, the first fixing means are provided on two opposing base elements, one base element being fixed to the first and left sections, respectively, via the first fixing means, and one base element being fixed to the second and right sections, respectively, via the first fixing means.

The base is preferably provided in a rectangular shape, with square bases being preferred. Polygonal bases are also possible.

The base is fixed to the inner side of the base card via first fixing means. The fixing means may be provided as part of the base, part of the base card or as independent elements and are accordingly fixable to the base and/or the base card. The first fixing means may extend along the length of a base element, but may also be shorter or longer than a base element. Preferably, the first fixing means are shorter than a base element.

Where the first fixing means are provided as discrete elements, they comprise a first area for fixing to the base card and a second area for fixing to a base element. The second area for fixing to the base element may be greater than, less than, or equal to the base element.

Provided that the second area of the first fixing means for fixing to the base element is provided larger than the corresponding base element, i.e. in particular higher and/or longer than the base element, then this second area of the first fixing means is fixed externally to the base element. Provided that the second area of the first fixing means for fixing to the base element is provided equal to or smaller than the corresponding base element, thus in particular lower and/or shorter than the corresponding base element, then this second area of the first fixing means is preferably fixed internally to the base element.

The base is composed of a plurality of base elements, each base element forming one side of the base. The base elements may be provided in one piece or in a plurality of pieces, and likewise the base may be provided in one piece or in a plurality of pieces. Preferably, the base elements and base are provided in one piece.

The individual parts of the base or the base elements can be connected to one another, in particular by adhesive and/or plug-in connections.

If the base is provided in one piece, this means that the base elements are coherent and only the terminal base elements have to be connected to each other to form the base, for example by gluing, plugging or other means.

If the base is provided in multiple parts, this means that the base elements must be connected at more than one point to form the base, for example four base elements must be glued or inserted into each other or connected in some other way to form a rectangular base.

The base is provided foldable at least between the base elements, wherein according to the invention the two base elements which are not fixed to the base card via first fixing means are also provided foldable, namely at the point where these cross the fold in the opened state of the base card.

According to the invention, the base is arranged parallel to the outer edges of the base card. In other words, this means that the two base elements fixed to the base card are arranged parallel to the fold of the base card and the two remaining base elements are arranged perpendicular to the fold of the base card. Accordingly, the two base elements arranged perpendicular to the fold also have a fold at the level of the fold of the base card, at which they are provided reversibly foldable.

Accordingly, when the 3D card is folded, the base elements which are not fixed to the base card are folded onto themselves at the fold, with both base elements preferably being folded in the same direction in each case, i.e. in accordance with the orientation of the unfolded base card either towards the upper or lower edge of the base card.

According to the invention, the base is fixed to the first or left section of the base card via first fixing means with a first base element and to the second or right section of the base card via first fixing means with a second base element.

According to the invention, the first fixing means are provided on two opposite base elements.

Preferably, the base card comprises notches in which the first fixing means can be fixed. According to the orientation of the base, the notches are arranged parallel to each other and parallel to the fold.

Alternatively, the base elements can also be fixed to the base card via the first fixing means without incisions.

The base or the base elements have second fixing means for fixing a figure on the side facing away from the base card.

The figure is essentially composed of first and second figure elements, each figure element preferably being fixed once to respective opposite base elements. In the preferred case of a rectangular or square base, a figure element thus fixed to two base elements then runs parallel to the two remaining base elements to which it is not fixed.

In particular, in a preferred embodiment, the second figure elements can also be fixed to the first figure elements alone and be fixed to the base via them. Likewise, alternatively, the first figure elements could also be fixed to the second figure elements alone and be fixed to the base via the second figure elements.

In the unfolded state of the base card, the first figure elements are aligned parallel to each other and the second figure elements are aligned parallel to each other. Accordingly, in the unfolded state of the base card, the first figure elements and the second figure elements are aligned perpendicular to each other.

Accordingly, the first figure elements are preferably provided fixed to the base elements that are not fixed to the base card by first fixing means, that is, with the base elements extending perpendicularly to the fold of the base card in the opened state of the base card. Accordingly, the first figure elements run parallel to the fold of the base card in the opened state of the base card.

The second figure elements are accordingly preferably provided fixed to the base elements which are fixed to the base card by first fixing means, i.e. with the base elements which run parallel to the fold of the base card in the opened state of the base card. Accordingly, the second figure elements run perpendicular to the fold of the base card in the opened state of the base card.

Accordingly, the second figure elements as well as the base elements, which are arranged perpendicular to the fold, also have a fold at the level of the fold of the base card, at which they are provided reversibly foldable. The second figure elements are provided foldable in the same direction as the base elements arranged parallel to them.

For fixing to the base elements and for fixing to possibly further figure elements, the figure elements preferably comprise third fixing means. In this case, the second and third fixing elements are preferably coordinated with one another in such a way that they permit simple assembly and, if necessary, disassembly of the respective elements.

Preferably, the 3D card further comprises light effects and acoustic effects that are triggered by opening the 3D card.

For this purpose, the 3D card comprises common electronic and electrical elements such as a power supply, a switch, an integrated circuit for controlling the electronic elements and a number of lighting elements and acoustic elements. Preferably, the electronic elements, with the exception of the light and acoustic elements, are arranged on a printed circuit board.

Preferred light elements are LEDs, whereby colors and number of LEDs can be arbitrary. Preferred acoustic elements are loudspeakers. The light and acoustic elements are provided to output certain visual and acoustic stimuli. A preferred power supply is batteries or rechargeable batteries.

The switch is used to activate the electronics when the 3D card is opened to add visual and acoustic stimuli to the opening and/or the opened state of the 3D card with the unfolded figure. Accordingly, all types of switches are suitable, as are light or motion sensors that enable activation of the electronics by opening the 3D card. The skilled person is familiar with corresponding switches and sensors.

The electronic or electrical elements are preferably arranged between two layers of the base card. If necessary, cutouts for the light elements are provided in the base card.

The invention provides a simple and inexpensive way to manufacture 3D cards with a base construction that allows parallel alignment of the figure elements to the edges of the 3D card.

The invention as well as the technical environment will be shown below with reference to the particularly preferred embodiment of the invention. However, the invention is not limited to the embodiment shown. In particular, the invention encompasses, to the extent that it is technically useful, any combination of the technical features listed in the claims or described in the description as relevant to the invention.

Figure 2:
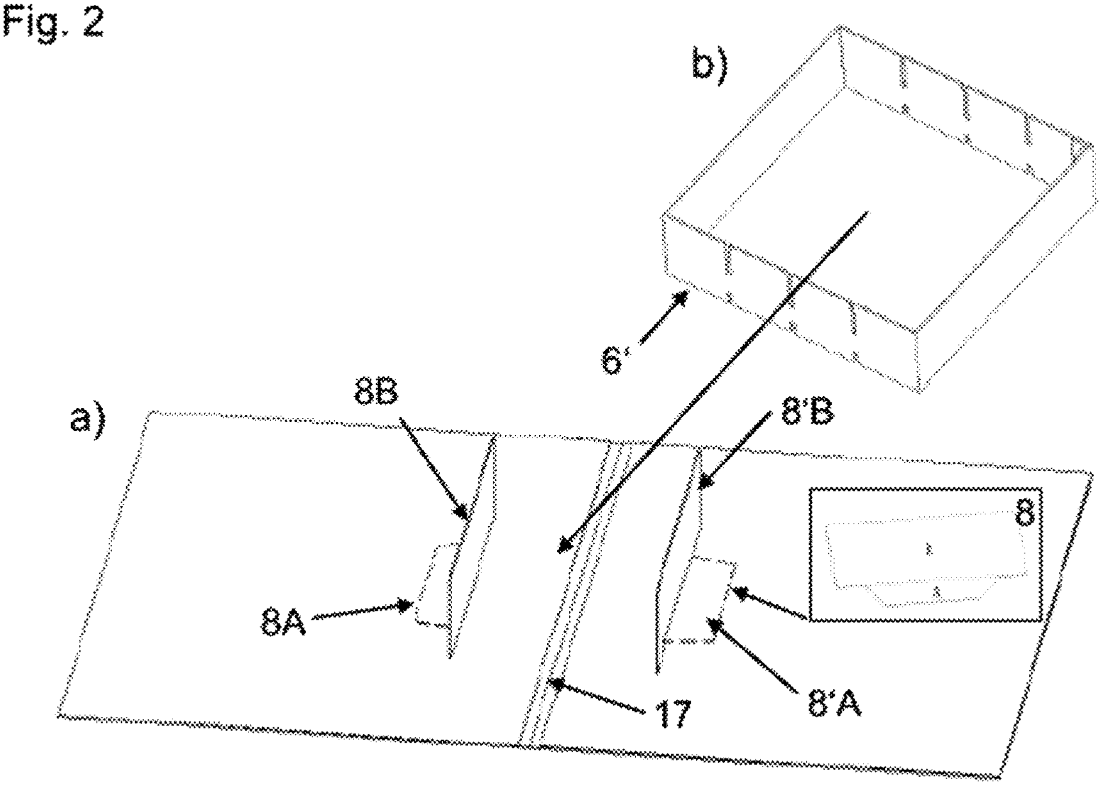
Figure 3:
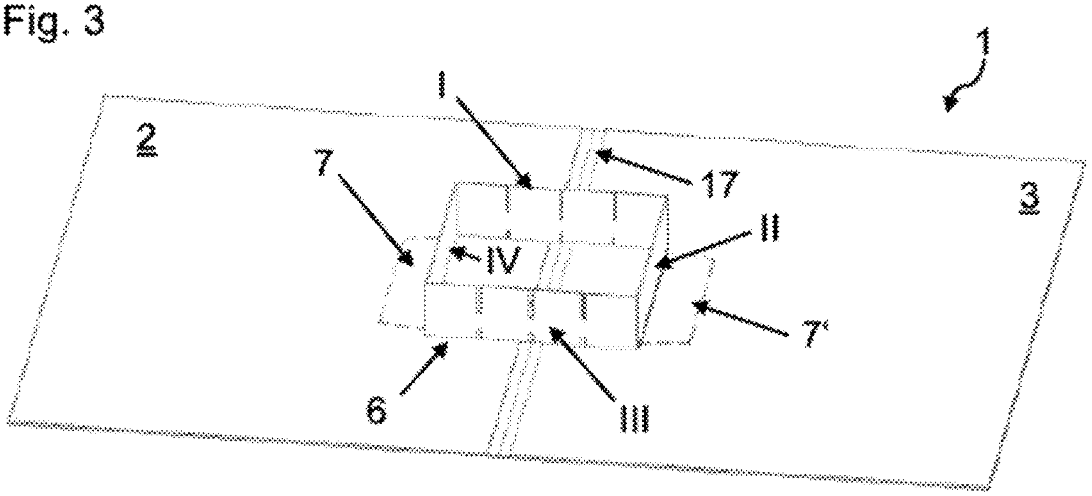
Figure 4:
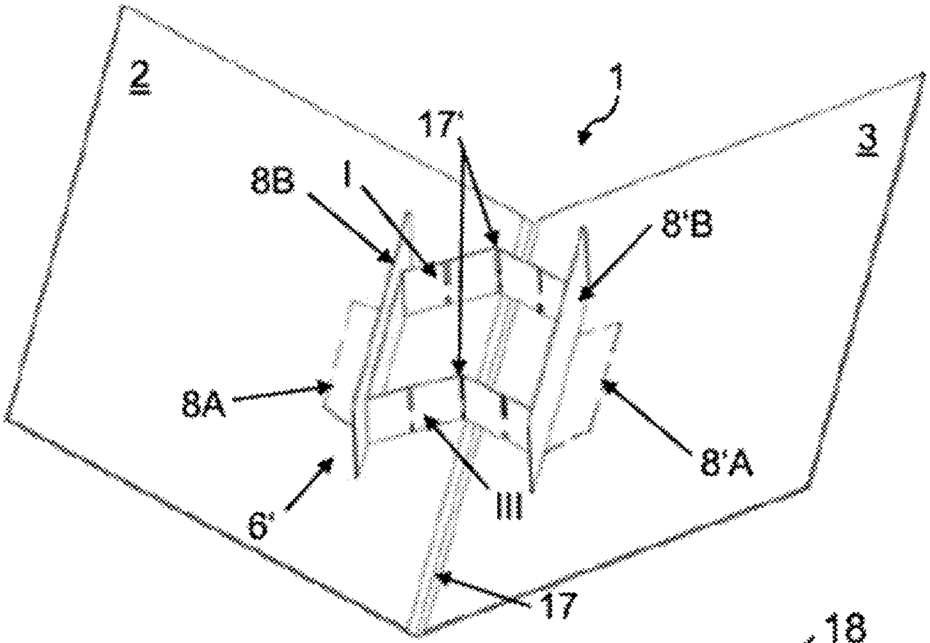
Figure 5:
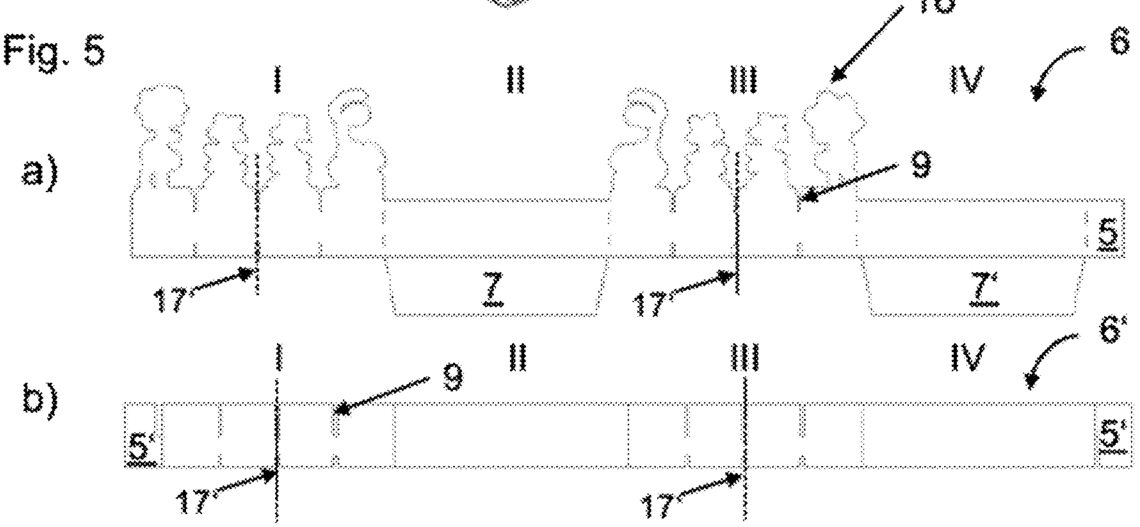
Figure 6:
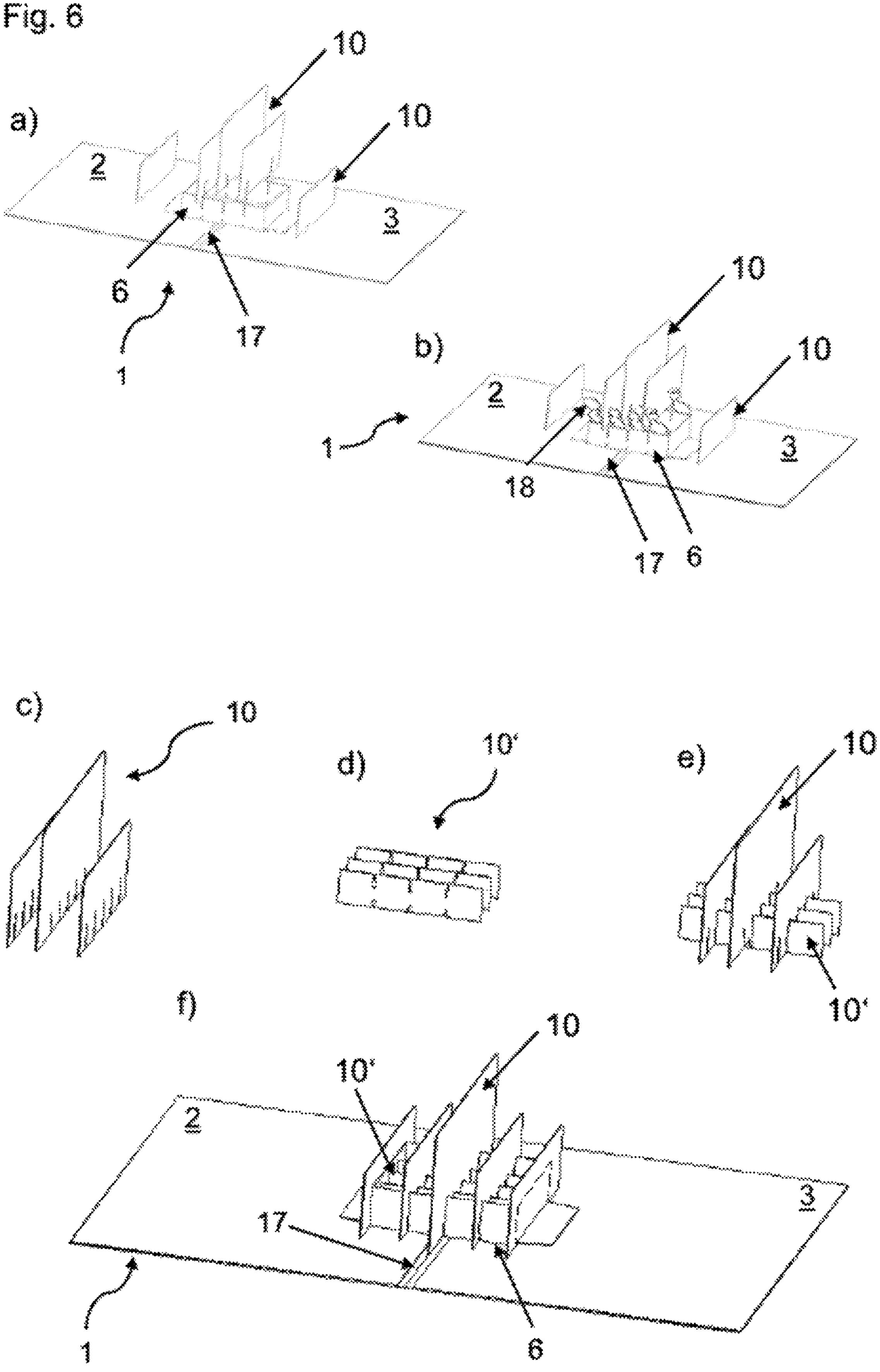
Figure 7:
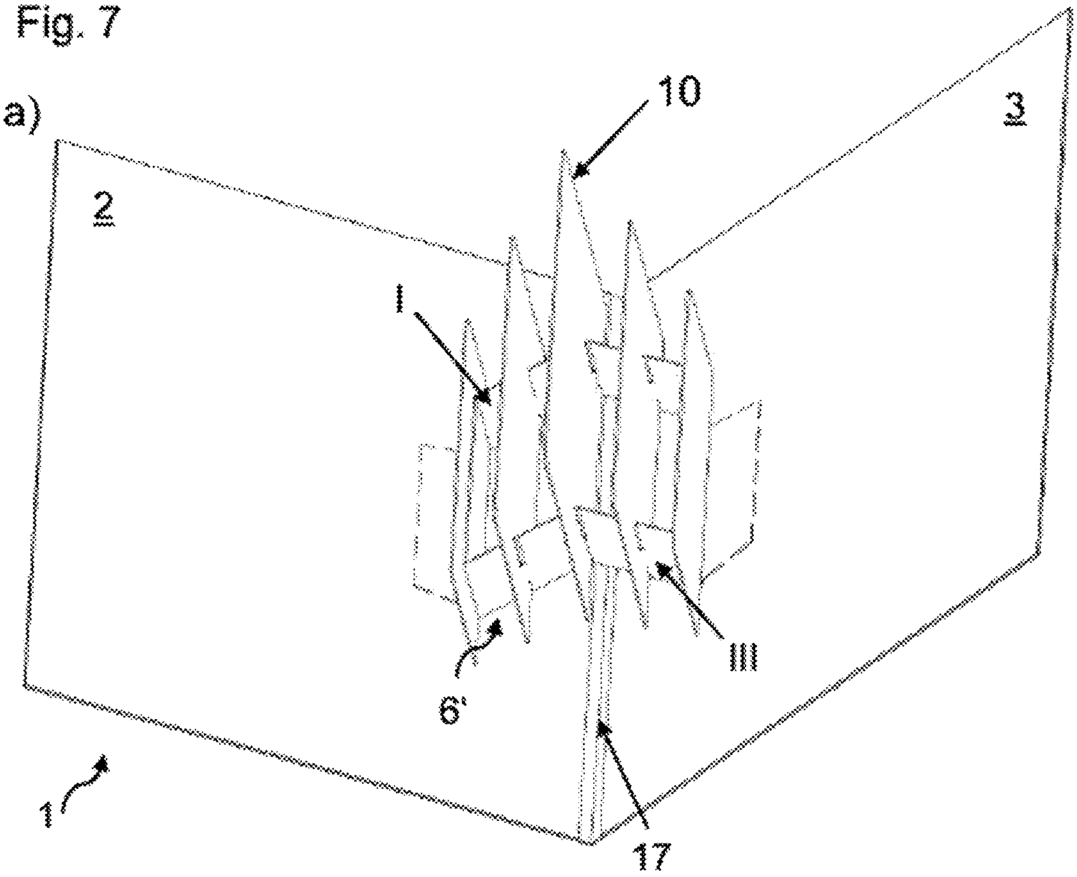
Figure 7:
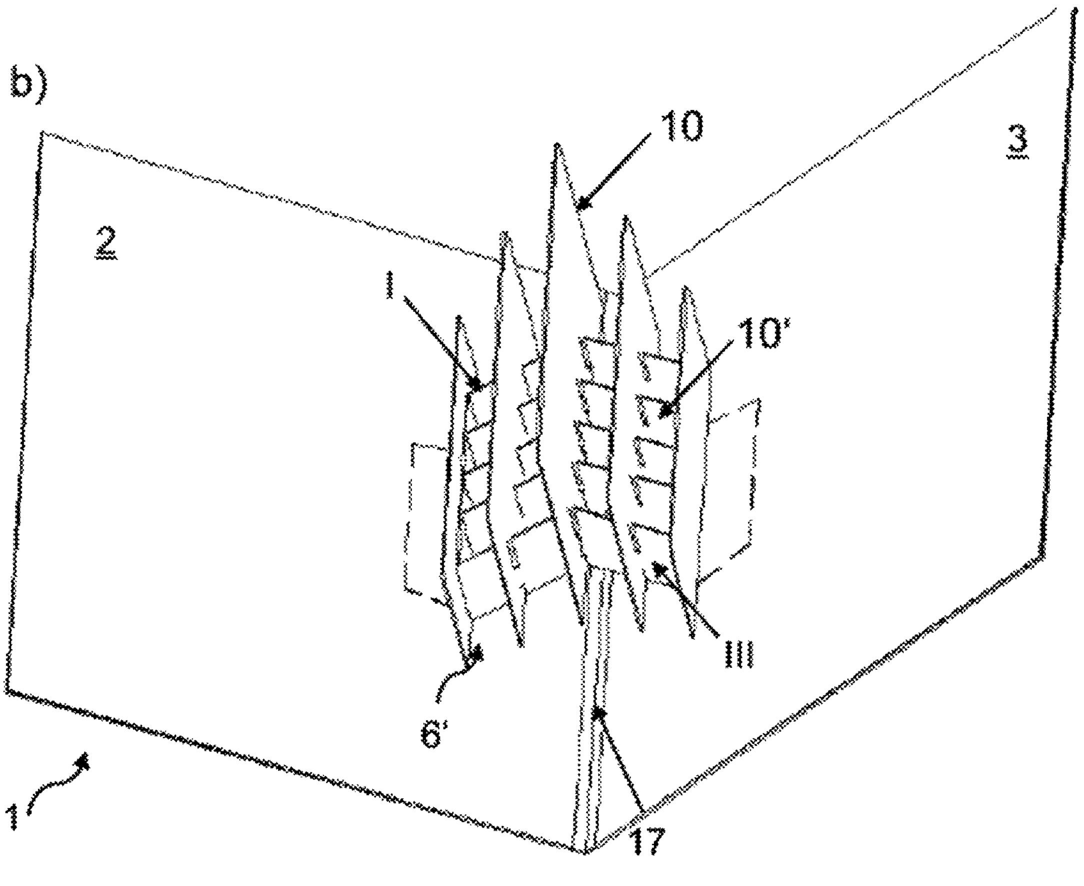
Figure 8:
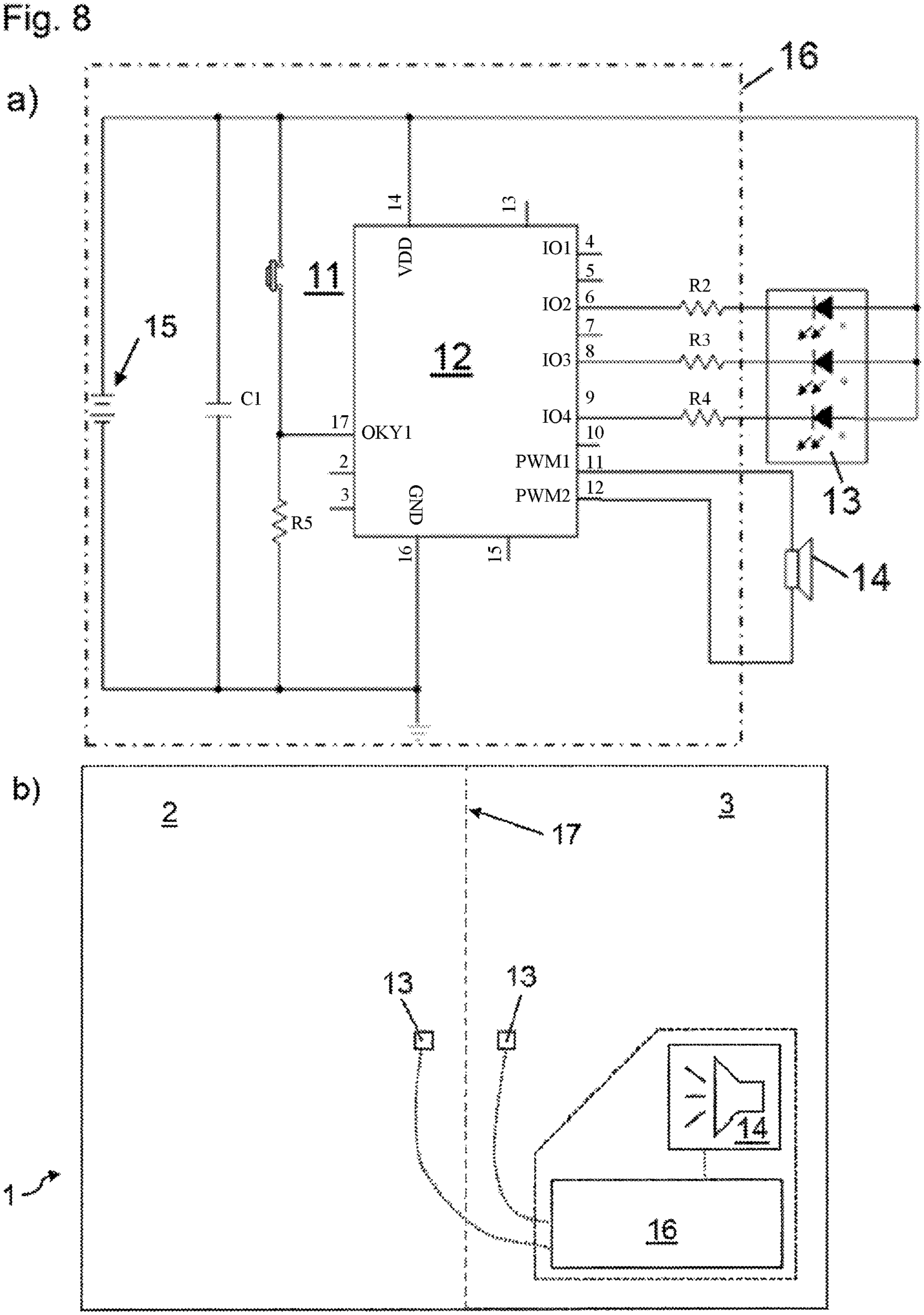

It shows:

FIG. 1 *a*) a first embodiment of the base card; b) with corresponding base;

FIG. 2 *a*) a second embodiment of the base card; b) with corresponding base;

FIG. 3 the first embodiment of the base card with fixed base;

FIG. 4 the second embodiment of the base card with base in partially folded state;

FIG. 5 different base embodiments;

FIG. 6 *a*)-*f*) the first embodiment of the base card with fixed base and further figure elements;

FIG. 7 *a*), *b*) the second embodiment of the base card with fixed base and further figure elements in partially folded state;

FIG. 8 *a*), *b*) a): the electronic circuit; b): the unfolded base card with schematically shown arrangement of the electronics.

FIG. 1*a* shows the base card 1 in the unfolded state with a first or left section 2 and a second or right section 3, wherein left and right sections 2, 3 are foldably connected to each other along a fold 17. The base card 1 is preferably provided in two layers. In the illustrated embodiment, notches 4, 4' are provided in the inner layer, wherein a first notch 4 is provided in the first section 2 and a second notch 4' is provided in the second section 3. The incisions 4, 4' are provided for receiving the first fixing means (see FIG. 1*b*).

The incisions 4, 4' are ideally arranged parallel to each other and to the fold 17.

FIG. 1*b* shows the base 6 suitable for the base card 1 with first fixing means 7, 7'. The first fixing means 7, 7' of the base 6 are fixed in the cuts 4, 4' for fixing the base, wherein the first fixing means 7 is provided in the cut 4 and the first fixing means 7' is provided in the cut 4'.

FIG. 2*a* shows the base card 1 according to FIG. 1*a* with an alternatively provided base 6' (see 2*b*).

FIG. 2*b* shows the alternative base 6' which does not comprise its own fixing means. The alternative first fixing means 8, 8' are independent elements in L-shape with a first area 8A respectively 8'A for fixing to the base card 1 and in particular to a notch 4, 4' and a second area 8B respectively 8'B for fixing to the base 6', the area 8A being fixed in the notch 4 and the area 8'A being fixed in the notch 4'.

The area 8B and 8'B, respectively, may project beyond the corresponding base elements, as shown. In this case, it is envisaged that the areas 8B and 8'B will be located on the outside of the corresponding base elements.

FIG. 3 shows the base card 1 according to FIG. 1*a* with the base 6 fixed. The base elements II and IV of the base 6 are fixed to the base card 1 and run parallel to the fold 17, the base elements I and III of the base 6 cross the fold 17 perpendicularly and are provided to be foldable at the intersection with the fold 17.

FIG. 4 shows the base card 1 according to FIGS. 2*a*, 2*b* in a partially folded state. It can be seen that the base elements I and III of the base 6' are also foldably provided at a fold 17' at the points where they cross the fold 17 and fold in the same direction, presently towards the upper edge of the base card 1. The base 6' is fixed with the base elements II, IV at the areas 8B, 8'B of the first fixing means.

FIGS. 5*a*-*b* show sectional patterns of various embodiments of square bases 6, 6'. The bases 6, 6' each comprise four base elements I to IV of equal length, which each comprise second fixing means in the form of inserts 9 for receiving a figure on the side facing away from the base card, in FIGS. 5*a*-*b* corresponding to the upper edge. In the present case, further folds 17' are provided centrally on the base elements I and III.

According to FIG. 5*a*, a first fixing means 7, 7' is provided on each of the base elements II and IV. The terminal base elements I, IV can be connected to one another via a tab 5, the tab 5 preferably being secured to the base element I by an adhesive connection.

Decorative elements 18 may be provided on the base elements I and III as part of the base elements. The decorative elements 18 can alternatively be attached subsequently.

According to FIG. 5*b*, a first fixing means is not provided on any base element I to IV of the alternative base 6'. The terminal base elements I, IV can be connected to each other via plug-in connections 5'.

The alternative base 6' can be fixed to the base card 1 via the alternative first fixing means 8, 8' (see FIG. 2). The alternative base 6' can also comprise decorative elements 18 (not shown).

FIG. 6*a* shows the preferred base card 1 with a base 6 as shown in FIG. 1*a* with further first figure elements 10 attached to the base 6.

FIG. 6*b* shows the preferred base card 1 with base 6 according to FIG. 1*a* with further figure elements 10, wherein the base 6 comprises decorative elements 18.

FIG. 6*c* shows the parallel aligned first figure elements 10 according to FIG. 6*a* in isolated view.

FIG. 6*d* shows the parallel aligned second figure elements 10' in isolated view.

FIG. 6*e* shows the first and second figure elements 10, 10' according to FIGS. 6*c-d* in combined view, wherein the first figure elements 10 are aligned perpendicular to the second figure elements 10'.

FIG. 6*f* shows the first and second figure elements according to FIG. 6*e* on a base card 1 with base 6 according to FIG. 6*a*. It can be seen that in this embodiment the second figure elements 10' are fixed in particular to the first figure elements 10 and do not comprise a plug-in connection with the base elements.

FIG. 7*a* shows the base card 1 according to FIGS. 2*a*, 2*b* in a partially folded state with first figure elements 10 and illustrates the folding mechanism. It can be seen that the base elements I and III of the base 6' fold in the same direction at the points where they cross the fold 17, in this case towards the upper edge of the base card 1. The first figure elements 10 run parallel to the fold 17 during the entire folding process and will at least partially come to rest on each other in the folded base card 1.

FIG. 7*b* shows the base card 1 according to FIG. 7*a* in the partially folded state additionally with second figure elements 10' and clarifies the folding mechanism. It can be seen that the base elements I and III of the base 6' and the second figure elements 10' fold in the same direction at the points where they cross the fold 17, in this case towards the upper edge of the base card 1. The first figure elements 10 run parallel to the fold 17 during the entire folding process and will at least partially come to rest on each other in the folded base card 1.

FIG. 8*a* shows a preferred circuit diagram for the electronics or electrics of the 3D card according to the invention with a power supply 15, a switch 11, an integrated circuit or also a microprocessor 12 as well as a number of light elements 13 and acoustic elements 14. Preferably, all of the elements mentioned with the exception of the light and acoustic elements 13, 14 are arranged on a printed circuit board 16.

Preferred light elements 13 are LEDs, whereby colors and number of LEDs can be arbitrary. Preferred acoustic elements 14 are loudspeakers. The light and acoustic elements 13, 14 are provided to output certain visual and acoustic stimuli. A preferred power supply 15 is batteries or rechargeable batteries.

The switch 11 is used to activate the electronics when the 3D card is opened, in order to add visual and acoustic stimuli to the opening and opened state of the 3D card with the unfolded figure. Accordingly, all types of switches which enable activation of the electronics by opening the card are suitable. Corresponding switches are known to the person skilled in the art.

FIG. 8*b* shows the foldable card 1 with recesses for the light elements 13 as well as the preferred arrangement of the electronics according to FIG. 6A. The light elements 13 are arranged in the recesses of the inner sides 2, 3. The printed circuit board 16 with the remaining electronics and the acoustic elements 14 are preferably arranged in a sandwich-like manner between the two layers of the card 1. Preferably, the printed circuit board 16 is located on the right side 3 of the base card 1, but the electronics can alternatively be arranged on the left side 2 or distributed on both sides 2,3. The same applies to the light and sound elements 13, 14, the arrangement of which is essentially based on the design of the 3D card and the desired effects and is subject to few technical constraints, provided that a folding of the base card 1 or the functioning of the electronic elements along the fold 17 is not impaired by the arrangement.

LIST OF REFERENCE SIGNS

1 base card
2 first or left section
3 second or right section
4, 4' notches
5, 5' connecting means (5: tab; 5': plug-in connection)
6, 6' base (I, II, III, IV: base elements)
7, 7' first fixing means
8, 8' alternative first fixing means (A: first area; B: second area)
9 second fixing means (inserts)
10 figure elements (10: first figure elements, 10': second figure elements)
11 switch
12 circuit/microprocessor
13 light element (LED)
14 acoustic element (loudspeaker)
15 Power supply
16 Printed circuit board (PCB)
17 fold (17: fold of base; 17': fold of base elements)
18 decorative elements

The invention claimed is:

1. A three-dimensional (3D) card comprising:
a figure;
a base card that includes a first section, a second section, and a fold positioned between the first and second sections, the base card to transition between an opened state and a closed state using the fold; and
a base structure that includes a first base element, a second base element, and a third base element coupled between the first and second base elements such that the third base element crosses the fold, the first base element affixed to the first section and the second base element affixed to the second section to couple the base structure to the base card, and the third base element coupled between the figure and the base card,
wherein the figure includes a non-foldable figure element coupled to the third base element where the third base element crosses the fold.

2. The 3D card of claim 1, wherein the figure is to remain planar as the base card transitions between the opened and closed states.

3. The 3D card of claim 1, wherein the figure includes a foldable figure element that crosses the fold.

4. The 3D card of claim 3, wherein another figure element of the figure is coupled between the foldable figure element and the third base element.

5. The 3D card of claim 1, wherein the figure includes a foldable figure element, and the non-foldable figure element is coupled between the foldable figure element and the base structure.

6. The 3D card of claim 1, wherein the figure includes a foldable figure element, and the foldable and non-foldable figure elements are arranged perpendicular to each other when the base card transitions to the opened state.

7. A 3D card comprising:
a base card that includes a first section, a second section, and a fold positioned between the first and second sections, the base card to transition between an opened state and a closed state using the fold; and;
a base structure that includes first and second base elements, the first base element affixed to the first section and the second base element affixed to the second section such that the fold is positioned between the first and second base elements, and the base structure to couple a figure to the base card such that a foldable element of the figure crosses the fold and a non-foldable element of the figure is positioned between the first base element and the fold.

8. The 3D card of claim 7, wherein the base structure further includes a third base element that crosses the fold and is coupled between the first and second base elements, and the third base element is provided as foldable in a common direction with the foldable element of the figure when the base card transitions to the closed state.

9. The 3D card of claim 7, wherein the base structure is a polygonal base structure that crosses the fold and comprises a plurality of base elements that include the first and second base elements.

10. The 3D card of claim 9, wherein each base element of the plurality of base elements that is unaffixed to the base card is provided foldable at a point where that base element crosses the fold.

11. The 3D card of claim 7, wherein the base structure includes a fixing means to couple between the base structure and the figure.

* * * * *